W. H. PRATT.
ELECTRICAL MEASURING INSTRUMENT.
APPLICATION FILED AUG. 14, 1911.
1,077,429.
Patented Nov. 4, 1913.
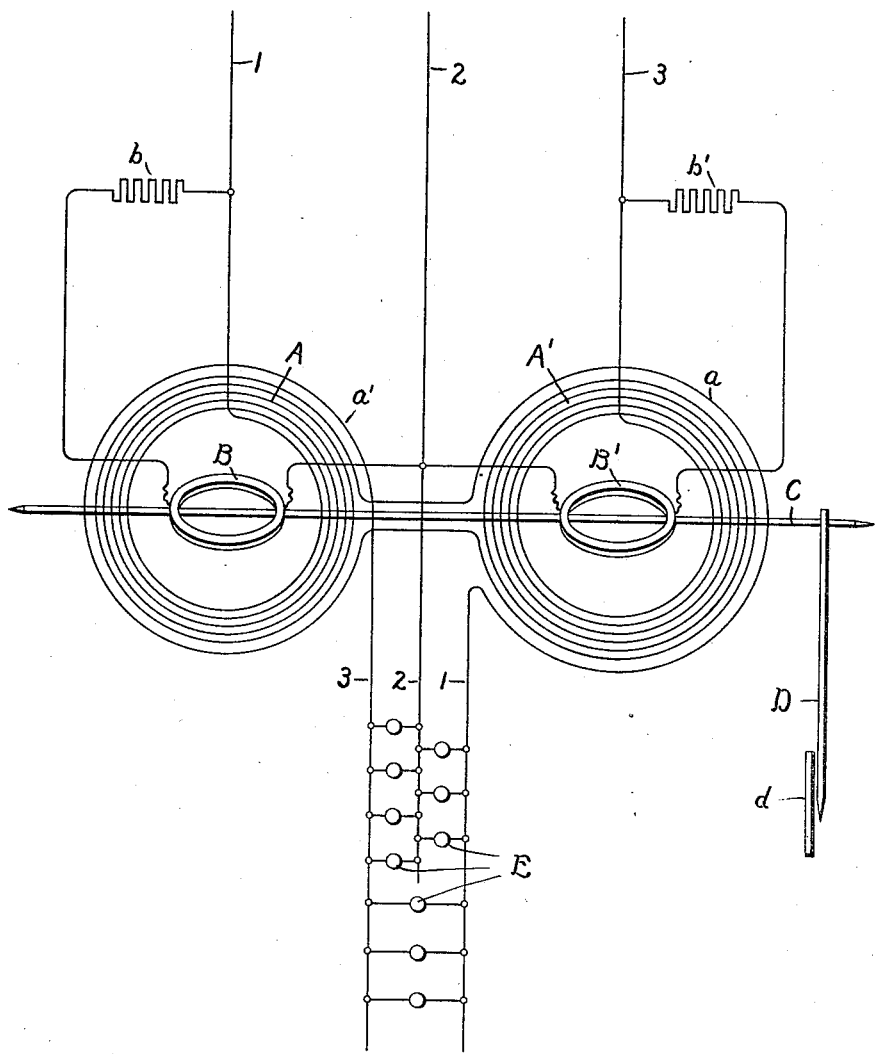
Witnesses:
Earl G. Klock.
J. Ellis Glen
Inventor:
William H. Pratt,
by Arthur B. Davis
His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRICAL MEASURING INSTRUMENT.

1,077,429. Specification of Letters Patent. Patented Nov. 4, 1913.

Application filed August 14, 1911. Serial No. 643,843.

*To all whom it may concern:*

Be it known that I, WILLIAM H. PRATT, a citizen of the United States, residing at Lynn, county of Essex, State of Massachusetts, have invented certain new and useful Improvements in Electrical Measuring Instruments, of which the following is a specification.

My invention relates to electrical measuring instruments for indicating or recording the total current or total power in multicircuit systems, such as multiphase systems or three-wire systems either alternating or direct current. For such purpose, it has been customary heretofore to employ two elements connected in separate circuits and coöperating to actuate a single indicating or recording device.

The object of my invention is to provide simple and effective means for preventing the leakage flux of one element from affecting the other element and thereby for assuring the accuracy of the instrument. Certain arrangements have been resorted to heretofore for this purpose. In one such arrangement a magnetic shield in the shape of an iron member has been interposed between the two elements. This is effective but increases the weight of the instrument. Another arrangement which has been used in instruments of the zero deflection type, such as dynamometers, has been to place the coils of one element in planes at right angles to those of the other element so as to make the windings of the two elements mutually non-inductive. Such an arrangement does not however entirely prevent interference in instruments in which the movable members deflect from the zero position, as in ordinary ammeters and wattmeters.

I obtain the desired result, or protection against disturbing leakage fluxes, by providing on each element an auxiliary winding properly arranged to neutralize the effect on that element of leakage flux from the other element.

My invention will best be understood by reference to the accompanying drawing, which shows diagrammatically an instrument arranged in accordance with my invention.

In the drawing 1, 2 and 3 represent three conductors of a multicircuit system. This system may be either three-phase, or two-phase, or a three-wire single phase or direct current system. Lamps or other current consuming devices are indicated at E. The indicating instrument shown diagrammatically consists of two elements each having a stationary actuating coil A or A′ and a movable coil B or B′. The coils A and A′ are connected in conductors 1 and 3, respectively, in series with the load and the coils B and B′ are connected in shunt to the load between conductors 1 and 2 and conductors 2 and 3, respectively, with resistances $b$ and $b'$ respectively in series with them. The connections shown are those of a wattmeter but it will be understood that my invention is not limited to wattmeters. The movable coils B B′ are carried on a common shaft C, which carries an indicator or needle D moving over suitable scale $d$.

In order to neutralize the effect of leakage flux from the stationary coil A on the movable coil B′ of the other element, I provide the auxiliary winding $a$ which is of few turns compared to the main winding A (in the drawing this auxiliary winding is shown as consisting of a single turn) connected in series with winding A and located in inductive relation to the moving coil B′ in the same plane as coils A and A′ or in a plane parallel thereto. It will be seen that if the coil $a$ is properly proportioned and properly located, it will completely neutralize the effect of leakage flux from coil A on coil B′ since the currents in the two coils A and $a$ are always the same. A similar coil $a'$ is placed over or adjacent to the coil A in inductive relation to coil B so as to neutralize the effect thereon of leakage flux from the coil A′ of the other element. Thus, all interference between the two elements is prevented.

I do not desire to limit myself to the particular construction and arrangement of parts shown and described but aim in the appended claims to cover all modifications which are within the scope of my invention.

What I claim as new and desire to secure by Letters Patent of the United States is:—

1. In an electrical measuring instrument two elements, each comprising a stationary and a movable winding, a mechanical connection between the movable windings, and auxiliary windings in inductive relation to one of the windings of each element and arranged to neutralize the effect upon said last mentioned winding of the leakage flux of the other winding of the other element respectively.

2. In an electrical measuring instrument, two elements, each comprising a movable member and a stationary actuating winding therefor, a mechanical connection between said movable members, and auxiliary windings, each in circuit with the stationary winding of one element and neutralizing the effect of its leakage flux on the movable member of the other element.

3. In an electrical measuring instrument for multicircuit systems, two elements, each comprising a movable member and a stationary actuating winding therefor, a mechanical connection between the movable members, said windings being connected in different circuits, and auxiliary windings of few turns compared to said actuating windings each in inductive relation to the movable member of one of said elements and connected in series with the actuating winding of the other element.

4. In an electrical measuring instrument, two elements, each comprising a stationary and a movable member, a mechanical connection between said movable members, an actuating winding and an auxiliary winding being comprised in one member of each element, the auxiliary winding having few ampere turns compared to the actuating winding, and the auxiliary winding of one element being connected in circuit with the actuating winding of the other element and acting to neutralize the effect of its leakage flux on the first element.

In witness whereof, I have hereunto set my hand this 11th day of August, 1911.

WILLIAM H. PRATT.

Witnesses:
JOHN A. MCMANUS, Jr.,
OTTO F. PERSSON.

---

Copies of this patent may be obtained for five cents each, by addressing the "Commissioner of Patents, Washington, D. C."